(No Model.)
J. BAEUMLE.
BUNG EXTRACTOR.
No. 452,560. Patented May 19, 1891.
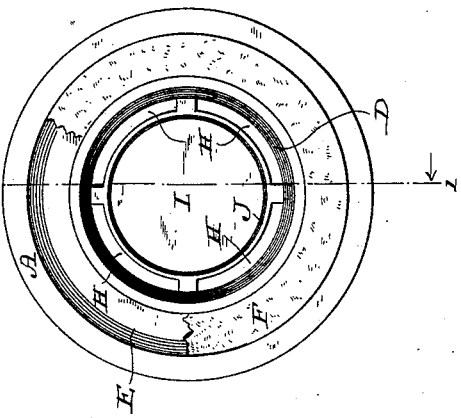
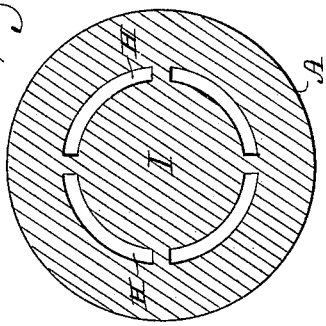
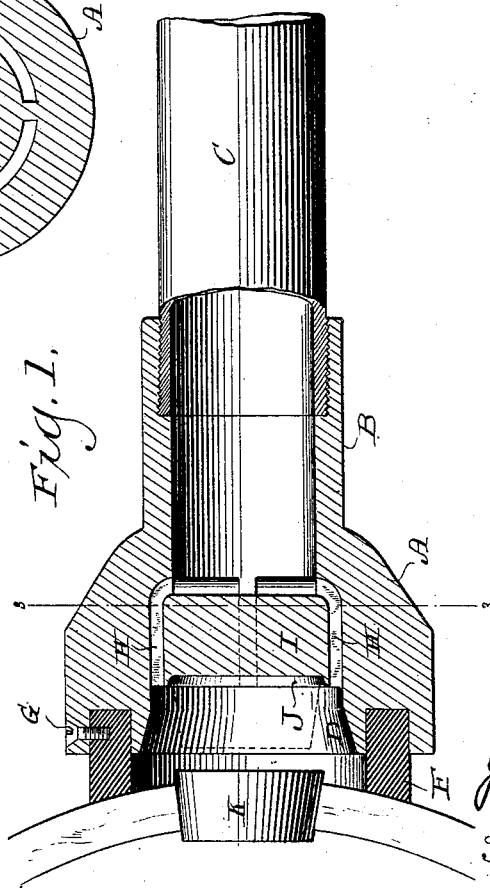
Witnesses
Geo. W. Young
N. E. Oliphant
Inventor
John Baeumle.
By H. G. Underwood
Attorney

UNITED STATES PATENT OFFICE.

JOHN BAEUMLE, OF MILWAUKEE, WISCONSIN, ASSIGNOR OF ONE-HALF TO VICTOR D. FISCHBECK, OF SAME PLACE.

BUNG-EXTRACTOR.

SPECIFICATION forming part of Letters Patent No. 452,560, dated May 19, 1891.

Application filed February 9, 1891. Serial No. 380,820. (No model.)

*To all whom it may concern:*

Be it known that I, JOHN BAEUMLE, a citizen of the United States, and a resident of Milwaukee, in the county of Milwaukee, and in the State of Wisconsin, have invented certain new and useful Improvements in Bung-Extractors; and I do hereby declare that the following is a full, clear, and exact description thereof.

My invention consists in certain peculiarities of construction and combination of parts constituting a bung-extractor, to be hereinafter described with reference to the accompanying drawings, and subsequently claimed.

In the drawings, Figure 1 represents a sectional view of my device in position to extract a bung, the section being taken on line 1 1 of the succeeding figure; Fig. 2, a plan view of the device inverted, and Fig. 3 a horizontal section on line 3 3 of Fig. 1.

Referring by letter to the drawings, A represents a cast-metal head, having a tubular shank B screw-threaded to engage a pipe C, that is designed to connect with any suitable suction apparatus. The lower end of the head is centrally provided with a circular recess D, and intermediate of this recess and outer wall of said head is an annular recess E for a gasket F, of rubber or other suitable material, held in place by countersunk set-screws G, or such other means as may be found desirable. Air-passages H, of any suitable number and arrangement, connect the central recess D of the head with the bore of the tubular shank B, and the solid portion or bung-stop I of said head between said recess and shank-bore is preferably so shaped upon its under side as to form a seat J within the line of the air-passages, as best illustrated in Fig. 1.

The gasket F extends beyond the head A and has its outer end of such shape as to conform to the outside of a cask, barrel, or analogous device and form an air-tight joint in connection therewith.

In practice the device above described is placed against a barrel or like device so as to have the gasket F surround the bung K of the same and form an air-tight joint. Suction being exerted, the bung is drawn from its hole into the recess D of the head A and up against the seat J, above described, this seat serving to center said bung, and thus prevent it from clogging the air-passages. As air from the barrel is now drawn into the recess D of the head A, the connection between gasket F and said barrel is easily broken, and this being done the bung is discharged by its own gravity.

The operation above described is very quickly performed, and there is no impairment of the bung. Consequently I effect a saving in the matter of time and bungs as compared to the usual method of extracting the latter from beer and other barrels into which they are tightly driven and swelled.

Having thus described my invention, what I claim as new, and desire to secure by Letters Patent, is—

1. A bung-extracting device comprising a recessed head having a tubular shank for connection with a suction apparatus, suitable means for forming an air-tight connection between the recess in the head and a barrel or analogous vessel, air-passages connecting said recess and shank, and a solid portion or bung-stop within the line of the air-passages, substantially as set forth.

2. A bung-extracting device comprising a recessed head having a tubular shank for connection with a suction apparatus, suitable means for forming an air-tight connection between the recess in the head and a barrel or analogous vessel, air-passages connecting said recess and shank, and a solid portion within the line of the air-passages provided upon its under side with a seat, substantially as set forth.

In testimony that I claim the foregoing I have hereunto set my hand, at Milwaukee, in the county of Milwaukee and State of Wisconsin, in the presence of two witnesses.

JOHN BAEUMLE.

Witnesses:
N. E. OLIPHANT,
WM. KLUG.